United States Patent [19]

Greenblatt

[11] Patent Number: 5,692,040

[45] Date of Patent: Nov. 25, 1997

[54] METHOD OF AND APPARATUS FOR EXCHANGING COMPATIBLE UNIVERSAL IDENTIFICATION TELEPHONE PROTOCOLS OVER A PUBLIC SWITCHED TELEPHONE NETWORK

[76] Inventor: Richard David Greenblatt, 154 Concord Ave., Belmont, Mass. 02178

[21] Appl. No.: 608,977

[22] Filed: Feb. 29, 1996

Related U.S. Application Data

[63] Continuation of Ser. No. 269,816, Jun. 30, 1994, abandoned.

[51] Int. Cl.[6] .................................................. H04M 1/50
[52] U.S. Cl. ........................... 379/350; 379/201; 379/257; 379/386; 379/418
[58] Field of Search .................................. 379/351, 352, 379/353, 354, 355, 386, 283, 350, 257, 418, 67, 88, 89, 201

[56] References Cited

U.S. PATENT DOCUMENTS

| | | | |
|---|---|---|---|
| 4,460,808 | 7/1984 | Battista et al. | 379/351 |
| 5,163,050 | 11/1992 | Cromack | 379/351 |
| 5,214,693 | 5/1993 | Chujo | 379/351 |
| 5,319,703 | 6/1994 | Drory | 379/351 |
| 5,321,745 | 6/1994 | Drory et al. | 379/351 |
| 5,333,191 | 7/1994 | McCarthy | 379/351 |
| 5,353,342 | 10/1994 | Pietrowicz | 379/351 |
| 5,406,621 | 4/1995 | Binal | 379/351 |

*Primary Examiner*—Krista M. Zele
*Assistant Examiner*—Scott Wolinsky

[57] ABSTRACT

A method of and apparatus for providing compatible universal identification telephone protocols by generating predetermined unique audio sequences recognizable by the telephone user as defining standardized Audio Icon information and distinct from and separated from one another and other telephonically transmitted signals; sending and receiving such generated audio sequences on a public switched telephone network having paths the parameters of which fall within predetermined specified training sets, including modem performance standards; and assuring recognition and correct identification of such audio sequences conveyed along such paths.

17 Claims, 3 Drawing Sheets

AUDIO ICON "BING-BONG-BOONG"
AND POWER GRAM

DATA CAPTURE PORTION OF RECOGNIZER R

COMPARISON MODULE OF RECOGNIZER R
(REPLICATED PER BIN PER RANK)

SUM AND OUTPUT OF RECOGNIZER R
GENERALIZED "GRANDMOTHER" CELL

METHOD OF AND APPARATUS FOR EXCHANGING COMPATIBLE UNIVERSAL IDENTIFICATION TELEPHONE PROTOCOLS OVER A PUBLIC SWITCHED TELEPHONE NETWORK

This application is a file wrapper continuation of parent application Ser. No. 08/269,816, filed Jun. 30, 1994, now abandoned.

FIELD OF THE INVENTION

The present invention relates to telephone identification protocols, being more particularly directed to techniques for exchanging along public-switched conventional telephone lines, paths and networks, standardized audio sequences which provide useful information regarding telephonic conditions, operations and capabilities to both human listeners and telecommunications equipments.

BACKGROUND OF INVENTION

In the telephone art, information such as recognizable busy signals and other distinctive tones and messages, have been guiding the user in various protocols involving the use of the telephones and modems associated with answering and other systems. Each country, unfortunately, has developed its own distinct signals, not, however, understandable to users of other countries. In other areas than telephony, cross-cultural internationally recognized public information symbols have been gradually introduced into everyday life. In the U.S. during the late 60's and early 70's, while there was a certain amount of resistance to standardization, reasonable, forward-looking people recognized that these icons were desirable. In the name of drawing the peoples of the world together, they were willing to make the minor accommodations required personally to become familiar with the new symbols, as well as make other slight adjustments. Today, these icons represent a notable, if little remarked, success story. Tens of millions of international travelers on literally billions of occasions have functioned better because of these icons which, in a small but real way, enable all the peoples of the world to share a bit of mutual culture. It would be literally unthinkable for the designers of a new international airport to fail to employ the standardized public information symbols. In the unlikely event they ever did, it would probably be regarded by many as a hostile, isolationist gesture.

Among such icons are those described in ISO 7001:1980 (public information symbols); ISO/TR 7239-1984 (development and principles for application of public information symbols); ISO 9186:1989 (procedures for the development and testing of public information symbols); and ISO 3461-1:1988 (general principles for the creation of graphical symbols—part 1: graphical symbols for use on equipment).

International telephony, however, touches an increasing segment of the world's population every year, and there is every reason to expect the world to "shrink" at a rapid rate. If anything, it is even more important to the international telephonic traveler than to the physical visitor to be able correctly to interpret key indications which he or she may encounter. Unfortunately, at the present time, a comparable system of internationally recognized audio symbols which are termed or coined "AudioIcon" systems herein, has yet to be introduced and standardized upon. The lack of worldwide standardization in call progress tones, for instance, has been a frequently commented upon minor annoyance for many years. In today's interconnected world, the confusion and inefficiency this causes are becoming less and less tolerable. To take one example among many, the ringing sound used in Romania is very much like the busy tone used in North America. Who knows how many calls have been needlessly abandoned due to this confusion, or how many will be in the future? "AudioIcon" signaling, once adopted and employed as an international standard, would provide a worldwide, uniform, consistent interface to telephone system users. Travelers would at last find telephone operation to be similar everywhere.

"AudioIcon" type standardized audio sequences signal telephonic conditions, analogous to the standardized graphical icons used in airports or highways. The present invention deals with the automatic recognition of such signals and constitutes a fully compatible extension of all existing and proposed modem standards and recommendations, and in addition is useful and friendly to humans who may hear it, even when operating ordinary telephone instruments. "AudioIcon" signaling is completely separate from the current proposed ITU V.8 standard (later more fully discussed), although it achieves some of the same objectives. "AudioIcon" signaling could interoperate smoothly with or without V.8 and, indeed, all other known standards and recommendations.

Detection and recognition of signals by automated equipment is classically done by pure tones. "AudioIcon" signaling, on the other hand, is based on "human-oriented signals". A human-oriented signal is defined as one having a complex, rapidly-changing spectrum, and which, furthermore, has been designed to have pleasant and distinctive sound to human ears. Ordinary human speech and music are common examples of human-oriented signals. If, in addition, the human-oriented signal has been designed to be easily recognizable by modern DSP equipment programmed as described subsequently, and is of a suitable duration for such use, then it is referred to herein as an "Omniphone" (™) type Recognizable Signal, or ORS. Finally, if the ORS itself has been standardized and assigned a meaning, it becomes herein an "AudioIcon" signal, by analogy with other standardized graphical icons, such as the public information symbols used in airports or along highways. "AudioIcon" signals will be normally separated from one another and from other signals by brief intervals of silence, although suitable algorithms may exhibit considerable ability to "pull out" an "AudioIcon" signal from other signals. The detection problem is more akin to "segmented" speech recognition. Actually, however, "AudioIcon" signal recognition problem (later described in connection with the operation of the data capture portion, FIG. 2, the comparison modules portion, FIG. 3A, and the sum and output module portion, FIG. 3B, of the recognizer R) is much simpler than even the segmented speech problem since the excitation signal is exactly specified. This does not preclude, of course, the design of "AudioIcon" signals that sound "related" or even "concatenated" to the human ear: for signaling purposes each complete combination is considered a separate "AudioIcon" signal.

Thus, an "AudioIcon" signal may be visualized as a sequence of typically two to four (but possibly more) bell or gong-like sounds each of which is notated by a descriptive word or sequence of words in brackets. [Hel] [lo], for example, refers to a two stroke sequence suitable for telephone answering purposes. [Hel] [lo] [V.34] is a completely different "AudioIcon" signal consisting of similar sounding first two strokes followed by another one identified as [V.34]. Answering the phone (later described as T in FIG. 4) with this "AudioIcon" signal would signify a primary preference to provide V.34 service (at V.34). This is more fully described in the Preferred Embodiments of the Invention section hereof.

The assertion that "AudioIcon" signaling is upward compatible with all existing and proposed standards and recommendations is based on Section 11 (2100-Hz tone recognition) in CCITT Recommendations V. 25 [6] and similar paragraphs in other standards and recommendations; such falling into the category of "speech" under these paragraphs and thus not interfering with operation of standardized modems or other devices.

OBJECTS OF INVENTION

The principal object of invention is to provide a new and improved method of and apparatus for a compatible identification protocol with unified human-oriented signals on public associated telephone networks.

A further object is to provide such a novel apparatus that enables exchanging along publicly-switched conventional telephone lines, paths and networks, standardized audio sequences which provide useful information regarding telephone conditions, operations and capabilities to both the human listener and the telecommunications equipment.

Other and further objects will be explained hereinafter and are more particularly delineated in the appended claims.

SUMMARY

The invention embraces a method of providing compatible universal identification telephone protocols, that comprises, generating predetermined, unique audio sequences recognizable by the telephone user as defining standardized information and distinct from and separated from one another and other telephonically transmitted signals; sending and recognizing such generated audio sequences on a public switched telephone network (PSTN) having paths the parameters of which fall within predetermined specified training sets, including modem performance standards; and assuring the desired probability of correct identification of such audio sequences conveyed along such paths.

The systematic marking of the telephonic landscape with "AudioIcon" signals, moreover, will bring many of the same benefits that the use of standardized public information symbols on roadsides and in airports has achieved, spanning all areas of the telephonic experience. Humans will become conditioned to frequently heard "AudioIcon" signals such as internationally standardized call progress signals, and will thus achieve a higher degree of coordination than is otherwise possible. This remains true even if one assumes advanced equipment that might buffer or interpret other signals (such as modem signals) which might be used in other methods.

Preferred embodiments and best mode designs are hereinafter described.

BRIEF DESCRIPTION OF THE DRAWINGS

The invention will now be described with reference to the accompanying drawings of which.

PREFERRED EMBODIMENTS OF INVENTION

Figure 1:
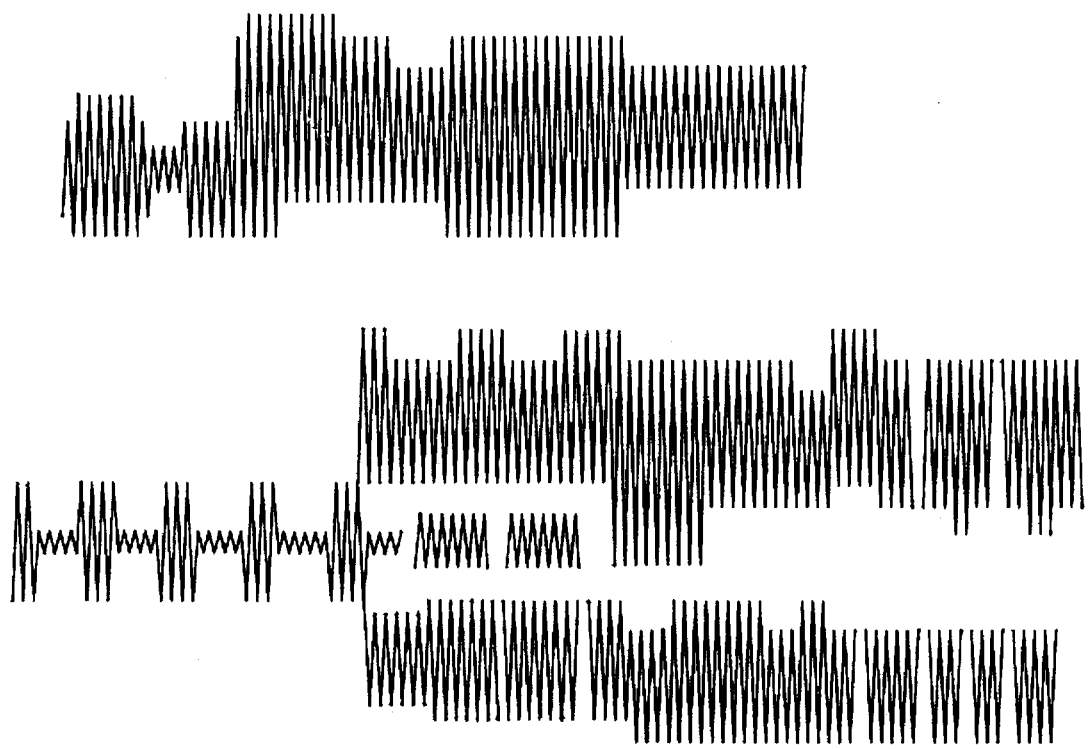
FIG. 1 is a power spectrogram of a typical "AudioIcon" signal in accordance with the invention.

Preliminary to examining an illustrative implementation of the invention, as presented in the drawings, it is in order to consider various operational considerations underlying the invention.

Interoperability

"AudioIcon" signaling offers a marked improvement in telephonic interoperability and the friendliness of that interoperability, particularly when unaided humans operating ordinary telephones (T, T', FIG. 4) are considered to be part of that system. To begin with, all signals transmitted by instruments (T, T') employing human-oriented signaling (S, S') are by design pleasant and distinctive to human ears. Even within the domain of data transmission, interoperability is improved as compared, for example, with V.8, although the difference is less dramatic. This improvement comes about principally because "looks like voice" gives a "cleaner" starting point outside the welter of existing recommendations, standards, and practices than is available to V.8. For instance, in some contexts, V.8 signals might possibly be confused with V.21 signals. In addition, it appears it will frequently be possible to achieve significant reductions in data-mode start up time with "AudioIcon" signaling which also have superior "context free" recognizability than V.8 type signals, as will be discussed hereinafter. Improved "Information Efficiency"

From the information theoretic point of view, an "AudioIcon" signal can be viewed as a single coherent signal—the term coherent being here used in a sense somewhat analogous to coherent light. V.21, other modem protocols, and even modulated 2100 cycles, on the first hand, are highly composite in the sense that first condition A is established, then, maybe changed to frequency or condition B to send a bit, and then those pieces assembled, etc. The coherent approach, however, is, of course, the optimal method from an information transfer viewpoint. Although the signal-to-noise ratios experienced on the Public Switched Telephone Network (PSTN, FIG. 4) are certainly adequate to support the operation of V.21, this information efficiency ultimately is reflected to the user as a savings of time. "AudioIcon" signaling, indeed, may be reliably recognized even in "free" contexts where they are not, a priori, expected. Furthermore, once—an "AudioIcon" signal has been provisionally recognized, the buffered data may be reexamined to extract considerable additional information.

Channel Measurements

Figure 2:
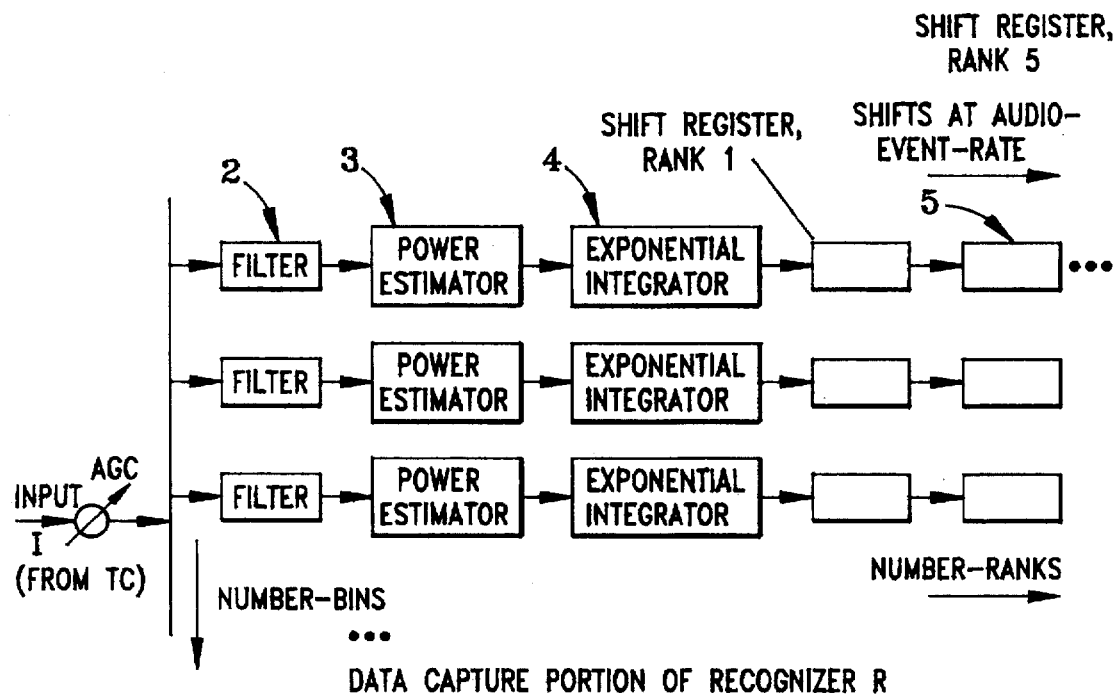
FIG. 2 is a block circuit diagram of the data capture portion of a preferred signal recognition implementation apparatus for the practice of the invention.

Since an "AudioIcon" signal represents an exactly known signal which has been passed through the channel of interest, a variety of channel measurements may be made by buffering the received signal and examining it closely. For example, the overall channel signal level, such as would normally be tracked by an AGC, FIG. 2, is immediately established to quite a high degree of accuracy. A reference point in time is defined with high precision which can be used as a point of departure for following signals. Moreover, other important channel parameters such as signal-to-noise ratio, frequency response, delay characteristics, and echo parameters can be estimated. Useful information on signal-to-noise ratio, local echo, distant echo, channel frequency response, and channel group delay can be extracted, all on the basis of a single "AudioIcon" signal. This information should be sufficient correctly to "classify" the channel as noise limited, distortion limited, or bandwidth limited, although the precision of this information may not be sufficient for all purposes (such as those served by modem training procedures). Furthermore, since the "AudioIcon" signal represents "ground truth", it continues to have value even after it has been initially processed and can be considered as part of any subsequent testing signal which may be employed. The ability to make such measurements accurately is facilitated, of course, by careful selection of the signal itself: assuring, for example, that it contains, at some instant during its duration, energy in each frequency band of interest, and so on.

Speed

Due to their positive operation, the use of "AudioIcon" signals is generally quicker than other means proposed to achieve similar objectives, particularly from a "cold" start over an unknown channel. The entire duration of the signal is normally in the range of from a fraction of a second to perhaps a second.

Although humans serve as an existence proof that communication with human-oriented signals is possible over telephonic channels (TC, FIGS. 2 and 4), including very difficult ones, the signal processing techniques humans employ are, of course, unknown. The current state of the art in computerized speech recognition, for example, results in effective performance many tens of decibels of signal-to-noise ratio worse than humans over telephonic channels, when, indeed, computerized speech recognition is able to function at all.

Reference Recognizer

There is hereinafter described, in connection with the drawings, the design of a suggested reference recognizer. This design has two particularly important properties:

(1) The design has several major parameters which may be varied to suit the requirements and/or cost objectives of the implementation; and (2) Positive recognition (at R, FIGS. 2, 3A, 3B and 4) of the "AudioIcon" signals under consideration is "guaranteed" by design for any channel (TC, FIGS. 2 and 4) in the training set. Given reasonable assumptions, such is also the case for any channel with frequency response and delay parameters lying between those of any two members of the training set. The most important remaining consideration, then, is the false identification rate, which may be lowered to any desired value by suitable setting of the major parameters.

Adjacent Standards

The "AudioIcon" signaling concept of the invention, fully developed, proposes to bind together the entire telephonic experience and thus potentially touches on practically every standard, and many things which are not currently internationally standardized. The following are comments on a proposal of the invention for the interaction of "AudioIcon" signaling with some current or pending standardization efforts.

Draft Recommendation V.txp

The adoption of the "AudioIcon" technique would be of particularly great benefit to the objectives and methods of V.txp, which are in large part oriented to the needs of the deaf or hard of hearing. "AudioIcon" type signals, in conjunction with a modest public education campaign, will permit ordinary people using ordinary instruments (T, T', FIG. 4) to recognize, for example, that they are being called by a deaf person using a textphone or that the call they have just made has been answered by a deaf person. This ability to educate ordinary people to recognize, for example, [calling] [textphone] and [hel] [lo] [textphone] "AudioIcon" type signals, would be stark in contrast to the blasting incomprehensibility to humans of the modem signals currently proposed by V.txp. Although current procedures provide a deaf person a limited ability to initiate calls via a special operator, their options for receiving or even answering "normal" calls are nearly nonexistant. Once alerted to the special nature of the call, the hearing party (who could be either the called or calling party) would have the option of responding in the most effective manner supported the by equipment at hand. In the case of relatively advanced equipment, the response might be as simple as speaking extra distinctly and leaving short pauses so as to maximize the effectiveness of the relatively primitive speech recognition equipment which is available. An ordinary touch-tone instrument could be used in a limited communication with an "AudioIcon" signal textphone equipped with a text-to-speech generator and a means of processing the DTMF responses. In the event the called equipment included a link to a Personal Computer, a higher-rate teletype style conversation would be possible. Thus the "AudioIcon" signaling approach would expand the pool of viable textphone contacts far beyond what would be available through the special-hardware-only approach of V.txp as proposed. The V.txp feature permitting routing for special operator handling and/or emergency priority could easily be provided as well; in fact, basing routing and other actions on automatic detection of the textphone "AudioIcon" signaling would have the added benefit of being easily generalized to any desired such signal.

IS-101

IS-101 (PN-2986) is an interim standard proposed by the TIA TR29 committee titled "Asynchronous Voice DCE Control Standard". The bulk of the standard concerns extensions to the AT command set dealing with voice, data, fax and other functions. This proposal would, in many cases, provide a standardized means for a modem which recognizes an "AudioIcon" signal to communicate that information. In other cases, important additional functionality could be obtained with little cost.

V.8

V.8 represents an attempt to achieve somewhat similar through more limited goals to those of "AudioIcons" by more conventional means. As mentioned previously, "AudioIcon" signals gain the same objectives in a somewhat superior fashion, while also approaching broader "human oriented" issues. Given the early state of development of "AudioIcons", there is every reason to proceed to standardize both V.8 and "AudioIcon" signals and work to insure that they coordinate well with each other.

"AudioIcon" Signals and V.34

Having established that "AudioIcon" signals are compatible with V.34, the question remains as to how they would best be integrated with the V.34 startup procedure. Two lines of thought suggest themselves: An ultra-fast startup used by mutually "AudioIcon" signal-aware terminals under good-to-excellent channel conditions, and a compatibility oriented approach which is also suitable for less ideal conditions. The ultra-fast startup might proceed as follows: The called terminal T answers the phone with the [hel] [lo] [V.34] "AudioIcon" signal at S. Hearing that, the calling terminal T' uses the received signal to evaluate the channel signal-to-noise ratio and other parameters, as discussed more fully in connection with the implementation of FIGS. 2, and 3. If these are generally of high quality and meet suitable criteria, the calling terminal T' responds with a [confirm] [V.34] [quickstart] [V.34.data] "AudioIcon" signal, after recognition in the recognizer R, FIGS. 2, 3A, 3B and 4, as later explained; receiving which, the called party also computes line parameters. If these appear suitable, the called party at T responds with a [start] [V.34] "AudioIcon" signal at S followed by a V.34 data stream. The initial parameters of these V.34 data streams would be fixed by convention; or, if there is a need for a small number of alternatives, this could be accommodated. All information currently planned to be transferred by the CM, JM, INFOa, and INFOc data packets would be quickly transferred in a format designed to "image" those data packets. There would then be a protocol-defined transition point for these supplied parameters to take effect, followed by full V.34 modem operation. With a scheme such as this, on a majority trials, a full V.34 connection can be in operation in about two seconds as compared to in the neighborhood of ten seconds required by conventional methods.

The other line of development would be identical to the current startup proposal, keyed by the modulated 2100 Hz tone, just as currently proposed. This entry would be used in all the cases in which the ultra-fast startup was not suitable, including difficult lines and/or lack of "AudioIcon" signal-aware equipment. If and when it was decided to disable suppressers in the ultra-quick startup procedure, pure 2100 Hz tone could be used.

Turning, now, to FIG. 1, the spectrogram of a typical "AudioIcon" signal is shown. As can be seen, energy is present in a different frequency regions at various times in a complex shifting pattern. In the case of gong or bell like sounds, the initial percussive impact gives rise to partials at many frequencies, while the later decay gradually resolves toward purer notes.

An illustrative and preferred technique is shown in FIGS. 2 and 3 for the positive recognition of any "AudioIcon" signal transmitted over any of the channels in the training set (for example, the TR37 test lines). The major remaining functional consideration in setting the various parameters is to insure that the false identification rate is acceptably low; FIGS. 2 and 3 presenting one possible implementation for exemplary purposes. Other methods may also be employed in various situations. While the design of FIGS. 2 and 3 is not what one usually considers a "neural net", particularly since all weights are set by design (after making measurements on the "AudioIcon" signal to be recognized), rather than by any sort of learning, nonetheless, it has a certain neural network flavor. The recognizer R of FIGS. 2 and 3 conceptually consists of the following elements:

(1) automatic gain control (AGC)/power input normalizer (2) filter bank [2] consisting of NUMBER_BINS FIR bandpass filters to resolve the audio spectrum into frequency bands; (in principle, the bands may be chosen in any manner desired, and FFT techniques may be employed if desired).

(3) spectral BIN power estimator [3] for monitoring the power in each band.

(4) exponentially integrating response energy storage elements [4] that integrate the power levels sensed over a short time period; (time constant is RESPTIME, providing a means to control temporal sampling error);

(5) temporal history record (a shift register, per bin) for holding the power values from earlier times and shifts at AUDIO-EVENT-RATE, usually in the range of 20–50 milliseconds. The temporal shift register has NUMBER_SHIFT_RANKS levels, thus, it can retain information for a total period equal to the product AUDIO_EVENT_RATE times NUMBER_SHIFT_RANKS.

Figure 3A:
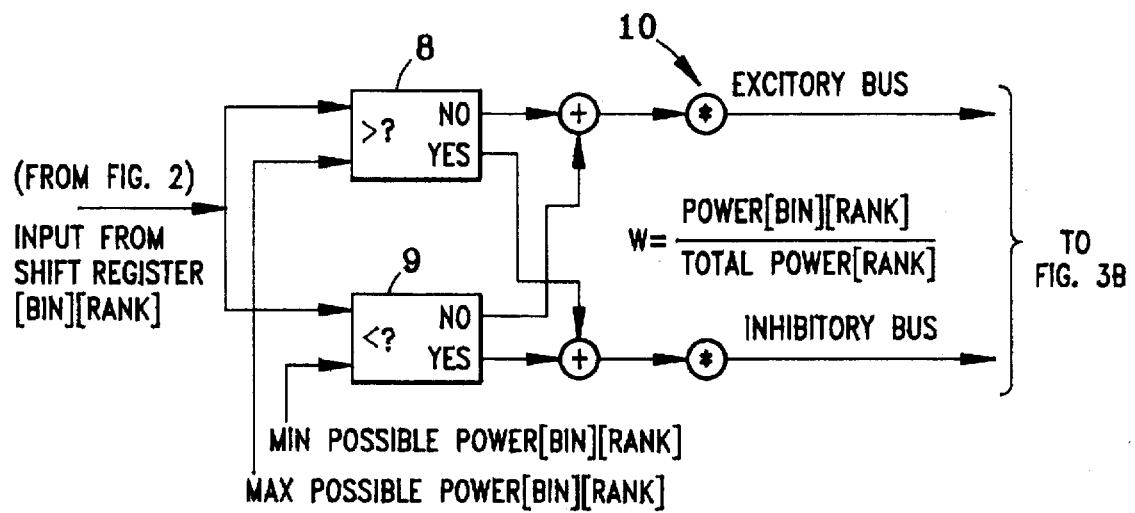
FIG. 3A is a block circuit diagram of a comparison module that compares outputs of the recognition implementation apparatus with predetermined coefficients.
Figure 3B:
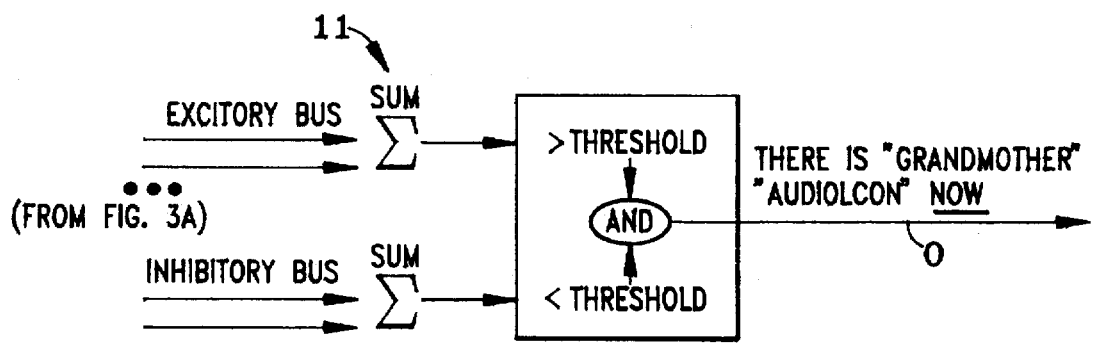
FIG. 3B is a block circuit diagram of a sum and output module that sums results provided by the comparison module to output a final; "there is the 'AudioIcon' I am looking for NOW" signal.

(6) recognition elements illustrated in FIG. 3 (called "grandmother" cells since each cell is "looking for" a single "AudioIcon" signal or "grandmother". Each cell does this by comparing the value in each shift register cell of the temporal history record with predetermined values. Two comparisons are made in FIG. 3A: a presence test at [8] and an excess test at [9]. The presence test confirms that at least the minimum amount of the power in the frequency bin in question is present at the time in question, based on the minimum which would be possible if the given "AudioIcon" signal were transmitted in or over any channel in the training set. The excess test confirms that no more power is present in this bin at this time than the maximum which would be possible if this "AudioIcon" were sent over any training set channel. The result of these two tests is weighted at [10] by the power present in that bin at that time in the original "AudioIcon" signal as a percentage of the total power, and the results summed at 11 in FIG. 3B over the entire temporal history record which has been retained by the shift register. "Grandmother" AudioIcon signal is thus recognized at O with high probability of assurance of correct identification if the excitory sum exceeds a threshold and the inhibitory sum is below a threshold.

As can be seen, the recognizer R is quite insensitive to the phase response of the channel TC at any point it is bridged therealong, and "grandmother" will be recognized by design so long as the channel response in each bin is "spanned" by members of the training set (and a few other reasonable assumptions hold). The primary parameters which may be varied to obtain the required false identification rate given random input are the number of bins employed (NUMBER_BINS), AUDIO_EVENT_RATE, and NUMBER_SHIFT_RANKS. Recognizer performance and computational budget requirements are both functions of these parameters.

Figure 4:
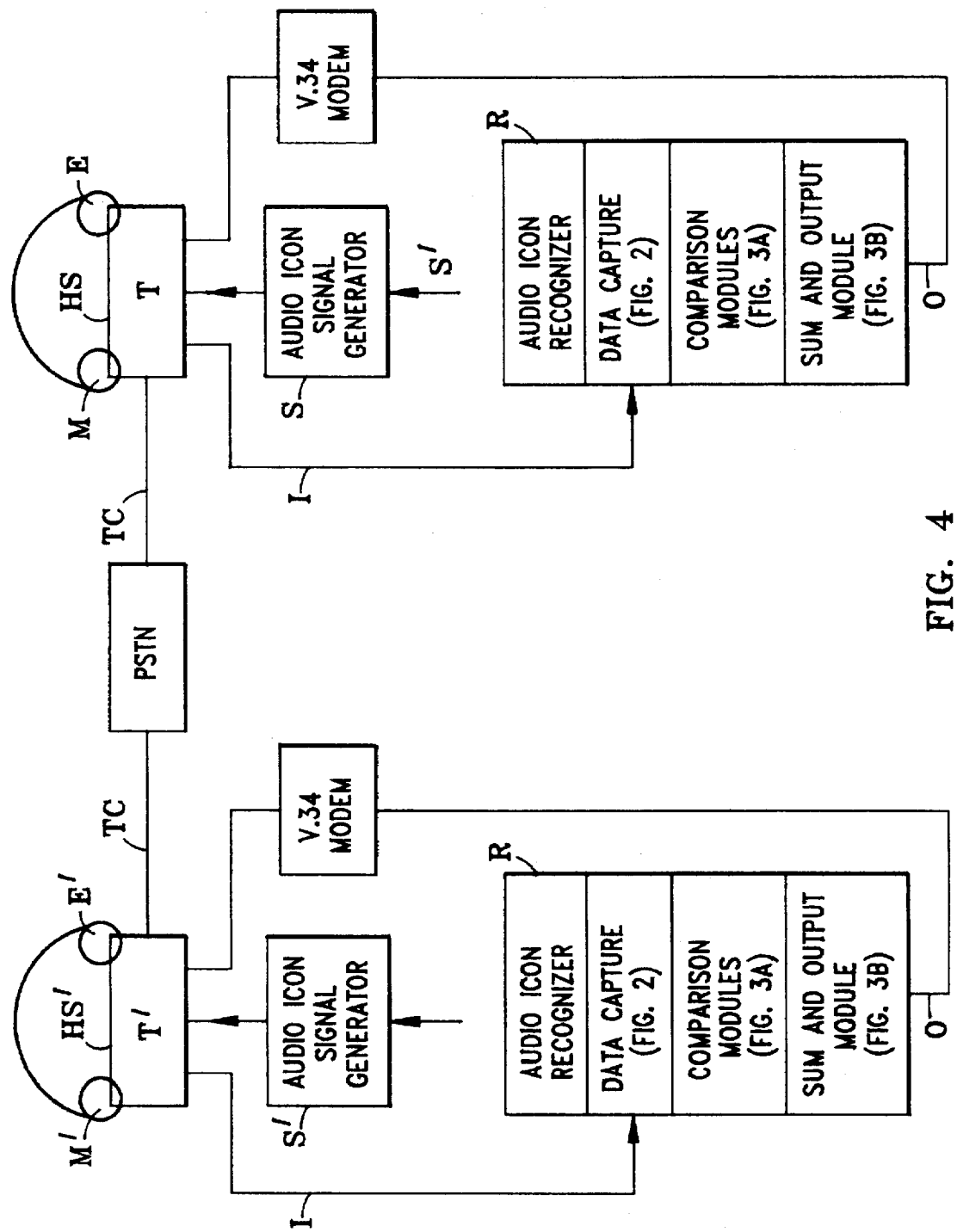
FIG. 4 is an overall system diagram of an illustrative example of the use of the "Audio Icon" signaling (FIG. 1) and its recognition (FIGS. 2, 3A and 3B) in a public switch telephone network having calling and receiver telephones as later described.

Recapitulating the overall Audio Icon signal use with regard to FIG. 4, a calling telephone instrument T' is shown schematically with its conventional microphone M' and earpiece E' operating in the usual manner in response to the lifting of the conventional hook switch HS' for the user to communicate along the telephone channel TC through the public switched telephone network PSTN or the like to a receiving telephone T, with its conventional microphone M, earpiece E and hook switch HS. In the previously described example, the telephones have been described for illustrative purposes as associated with V.34 type modems.

In operation, for example, the action of the lifting of the receiving telephone hook switch HS insert a signal $S_1$ into an Audio Icon generator S of the invention associated with the receiving telephone T to transmit back along channel TC to the calling telephone T' the before-described "Hello V.34" Audio Icon signal. This is heard by the caller and also passes into the Audio Icon recognizer R associated with the calling telephone T'. Within R, the signal first goes through the data capture portion of FIG. 2, where, as before described, the energy in the various frequency bands are separated and measured in time periods for comparison with expected values for the Audio Icon in one or more of the comparison modules of FIG. 3A, as earlier detailed. The output of the comparison module for the particular paths corresponding to this Audio Icon signal at this stage, will be excitory if there is confluence of the Audio Icon signal that has been sent and the operational distortion parameters of the channel TC within their allowable ranges or limit of predetermined specified training reference sets, as previously more fully described. This happens because the system started out with a precisely known quantity in the Audio Icon signal, and that Audio Icon signal was subjected to the distortion on the telephone channel within its prespecified limits of distortion, and was tested in the recognizer inclusion within the allowable range of resulting probabilities as previously explained.

The calling telephone T' may then send a responsive Audio Icon signal generated by its generator S' to assure the receiving telephone user at T that the caller is equipped with this sophisticated equipment and has recognized the Audio Icon signal from the receiving telephone T.

Some Illustrative AudioIcon Applications

As an example, the following lists are presented as illustrative "AudioIcon" signals. The purpose here is to give an idea of potential application areas, with some "hooks" for potential features that might be desirable in the future. For purposes of this example, we assume "AudioIcon" signals are a sequence of two to four bell or gong-like sounds, each of which is indicated by a pair of brackets.

[hel] [lo] a generalized answering indication, which may be further elaborated upon.

[hel] [lo] [operator] Indicates the answering party is an operator [either a phone company employee or a PBX (private business exchange) operator]. Hearing this, the human caller can immediately set his context, with savings in time and reduced confusion.

[hel] [lo][OmniPhone]™ (most general response when called party is capable of supporting MULTIPLE of the modes below.)

[hel] [lo] [modem-V.34 modem]

[hel] [lo] [current modem]

[hel] [lo] [fax]

[hel] [lo] [textphone] (ordinarily non-hearing person)

[hel] [lo] [videophone]

[hell [lo] [voicemail]

[hell [lo] [digitized voice, etc]

[start] [xx] (After receiving, [caller] [confirms] [xx], called party acknowledges requested service and actually starts it.)

"AudioIcon" signals generated at S' by the calling instrument T' are:

[caller] [confirms] [xx in hel-lo list]

This is a response to the corresponding [hel] [lo] class "AudioIcon" signal S sent by the caller T' which serves to confirm the class of service which will be stated. The receipt of this "AudioIcon" signal S' also confirms to the called party T that the caller T' is "AudioIcon" signal aware, and gives the caller an opportunity to measure line parameters.

[calling] [textPhone] (ordinarily non-hearing person)

[calling] [emergency]

[calling] [priority]

Typical "AudioIcon" signals S" generated by the PSTN FIG. 4, a PBX, or the local instrument T", are:

call progress indications:

[ring back]

[busy]

[reorder]

[time-out]

Additional "AudioIcons" signals may be connected with:

[call-forwarding] (user should forward)

[call-being-forwarded] (switch is forwarding)

[call waiting]

[call-waiting-priority]

[hold time-out] (signal to return to call which has been held)

informational:

[overseas trunk]

[round trip delay sensing]

[caller-id]

[ISDN] (sensing if full ISDN digital channel is present)

[robbed bit sensing] (or if not-quite-so-full digital channel is present)

Further modifications will occur to those skilled in this art and such are considered to fall within the spirit and scope of the invention as defined in the appended claims.

What is claimed is:

1. A method of providing compatible universal identification telephone protocols for use in a telephone system wherein a plurality of telephones communicate over a telephone channel via a public switched telephone network, said telephone protocols using Audio Icon signals consisting of predetermined standardized sequences of unique audio signals of complex rapidly changing spectrum having assigned predetermined meaning and distinct from dial, busy and ringing tones, the method comprising the steps of:

initiating a telephone call from one telephone to a second telephone over the telephone channel;

generating an Audio Icon signal at the second telephone in response to said telephone call;

sending the generated Audio Icon signal over the telephone channel to said one telephone; and recognizing the Audio Icon signal received at said one telephone by processing and testing the Audio Icon signal to confirm the correct identification of the Audio Icon signal.

2. A method as claimed in claim 1 and in which the Audio Icon signal contains successive frequency bands, and the recognizing step is effected by comparing the power of the frequency bands over a limited time to determine whether the Audio Icon signal is actually present therein.

3. A method as claimed in claim 2 and in which said limited time is set to correspond to a predetermined audio event rate.

4. A method as claimed in claim 2 and in which data is transmitted along the telephone channel in response to a determination that the Audio Icon signal is present within the frequency bands.

5. A method as claimed in claim 4 and in which said data originates from a modem.

6. A method as claimed in claim 2 and in which the recognizing step comprises the steps of:

capturing successive frequency band data in the Audio Icon signal over a limited time:

comparing the power in said frequency bands to determine desired excitory and inhibitor levels;

summing said levels; and comparing said summed levels to predetermined power thresholds.

7. A method as claimed in claim 6 and in which said capturing step comprises the steps of:

normalizing the power input:

filtering said frequency bands;

monitoring the power levels of said frequency bands over a period of time;

exponentially integrating response energy storage elements that integrate the power levels; and storing values of the power levels in temporal ranked shift registers.

8. A method as claimed in claim 7 and in which said power comparing step comprises the step of comparing the stored values in said temporal ranked shift registers to minimum and maximum predetermined power values.

9. Apparatus for use in providing compatible universal identification telephone protocols in a telephone system wherein a plurality of telephones communicate over a telephone channel via a switched telephone network; said telephone protocols using Audio Icon signals consisting of predetermined standardized sequences of unique audio signals of complex rapidly changing spectrum having assigned predetermined meaning and distinct from dial, busy and ring tones, the apparatus comprising:

means for initiating a telephone call from one telephone to a second telephone over the telephone channel;

means for generating an Audio Icon signal at the second telephone in response to said telephone call;

means for sending the generated Audio Icon signal over the telephone channel to said one telephone; and means for recognizing the Audio Icon signal received at said one telephone including signal processing and testing means to confirm the correct identification of the Audio Icon signal.

10. Apparatus as claimed in claim 9 and in which the Audio Icon signal contains successive frequency bands, and the means for recognizing comprises means for comparing the power of the frequency bands over a limited time to determine whether the Audio Icon signal is actually present therein.

11. Apparatus as claimed in claim 10 and in which said limited time is set to correspond to a predetermined audio event rate.

12. Apparatus as claimed in claim 10 and in which data is transmitted along the telephone channel in response to a determination that the Audio Icon signal is present within the frequency bands.

13. Apparatus as claimed in claim 12 and in which said data originates from a modem.

14. Apparatus as claimed in claim 10 and in which the means for recognizing comprises:

means for capturing successive frequency band data in the Audio Icon signal over a limited time;

means for comparing the power in said frequency bands to determine desired excitory and inhibitor levels;

means for summing said levels; and means for comparing said summed levels to predetermined power thresholds.

15. Apparatus as claimed in claim 14 and in which said means for capturing comprises:

means for normalizing the power input;

means for filtering said frequency bands;

means for monitoring the power levels of said frequency bands over a period of time;

means for exponentially integrating response energy storage elements that integrate the power levels; and means for storing values of the power levels in temporal ranked shift registers.

16. Apparatus as claimed in claim 15 and in which said means for comparing the power comprises means for comparing the stored values in said temporal ranked shift registers to minimum and maximum predetermined power values.

17. Apparatus as claimed in claim 9 and in which each of said plurality of telephones comprises said means for generating.

* * * * *